(12) United States Patent
Gemmell et al.

(10) Patent No.: US 6,360,181 B1
(45) Date of Patent: *Mar. 19, 2002

(54) SYSTEM AND METHOD FOR COLLECTING DATA ON PRODUCT CONSUMPTION

(75) Inventors: Bruce M. Gemmell, Wilmington, DE (US); Wesley J. McConnell, Alpharetta, GA (US); John R. Oyler, Horsham; James A. Winder, Meopham, both of (GB)

(73) Assignee: Kimberly-Clark Worldwide, Inc., Neenah, WI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/997,218

(22) Filed: Dec. 23, 1997

(51) Int. Cl.[7] ............ G01D 1/00; G06F 15/00; G06M 11/04
(52) U.S. Cl. ............ 702/128; 340/675; 705/22
(58) Field of Search ............ 364/468.15, 468.22; 702/128; 340/673, 675; 73/1.36; 341/8; 705/22, 28; 36/364, 468.15, 11, 700, 108; 700/115

(56) References Cited

U.S. PATENT DOCUMENTS

| | | | |
|---|---|---|---|
| 3,058,223 A | 10/1962 | Schmidt et al. | |
| 3,167,865 A | 2/1965 | Steinberg | |
| 4,097,726 A | 6/1978 | Satoh et al. | |
| 4,151,403 A | 4/1979 | Woolston | |
| 4,335,439 A | 6/1982 | St. Denis | |
| 4,456,193 A | 6/1984 | Westover | |
| 4,475,163 A | 10/1984 | Chandler et al. | |
| 4,535,949 A | 8/1985 | Olsson | |
| 4,570,348 A | 2/1986 | Amsler et al. | |
| 4,676,131 A | 6/1987 | Cassia | |
| 4,704,798 A | 11/1987 | Hird | |
| 4,721,265 A | 1/1988 | Hawkins | |
| 4,767,922 A | 8/1988 | Stauffer | |
| 4,786,005 A | 11/1988 | Hoffman et al. | |
| 4,835,698 A | 5/1989 | Beery et al. | |
| 4,882,568 A | * 11/1989 | Kyser et al. | 340/675 |
| 4,994,722 A | 2/1991 | Dolan et al. | |
| 5,031,258 A | 7/1991 | Shaw | |
| 5,050,093 A | 9/1991 | Reddy et al. | |
| 5,153,560 A | 10/1992 | Ichikawa | |
| 5,155,474 A | 10/1992 | Park et al. | |
| 5,177,446 A | * 1/1993 | Boriani et al. | 342/671 |
| 5,207,784 A | * 5/1993 | Schwartzendruber | 221/6 |
| 5,250,941 A | 10/1993 | McGregor et al. | |
| 5,257,462 A | * 11/1993 | Butterman | 33/732 |

(List continued on next page.)

FOREIGN PATENT DOCUMENTS

| | | |
|---|---|---|
| EP | 0209223 A1 | 1/1987 |
| EP | 0326528 A2 | 8/1989 |
| EP | 0574372 A1 | 12/1993 |
| EP | 0700024 A1 | 3/1996 |
| EP | 0792971 A1 | 9/1997 |
| NL | 8600003 | 8/1987 |
| WO | WO 9504333 | 2/1995 |
| WO | WO 9729465 | 8/1997 |

Primary Examiner—Marc S. Hoff
Assistant Examiner—Manuel L. Barbee
(74) Attorney, Agent, or Firm—Dority & Manning

(57) ABSTRACT

A system and method for collecting data on individual and aggregate use of various washroom products. The system includes one or more product dispensers having a sensor associated therewith for determining product usage. The sensor communicates usage information to local transmitter which responsively generates a data signal. The data signal is transmitted, such as by wireless techniques, to a central data collection unit. The central data collection unit receives and stores the data signal for later analysis. In exemplary embodiments, usage from a plurality of dispensers can be monitored by a single data collection unit.

24 Claims, 8 Drawing Sheets

U.S. PATENT DOCUMENTS

| | | | |
|---|---|---|---|
| 5,280,274 A | | 1/1994 | Uemura et al. |
| 5,500,517 A | * | 3/1996 | Cagliostro ................. 235/486 |
| 5,540,332 A | | 7/1996 | Kopacz et al. |
| 5,627,522 A | * | 5/1997 | Walker et al. ............. 340/618 |
| 5,691,919 A | * | 11/1997 | Gemmell et al. ........... 702/163 |
| 5,701,252 A | * | 12/1997 | Facchin et al. ............ 235/381 |
| 5,711,480 A | * | 1/1998 | Zepke et al. ................. 236/51 |
| 5,721,421 A | * | 2/1998 | VanDonkelaar ............ 235/462 |
| 5,878,381 A | * | 3/1999 | Gemmel et al. ............ 702/163 |
| 5,903,395 A | * | 5/1999 | Rallison et al. ............ 359/630 |
| 5,918,197 A | * | 6/1999 | Toussant et al. ........... 701/101 |

* cited by examiner

SYSTEM AND METHOD FOR COLLECTING DATA ON PRODUCT CONSUMPTION

BACKGROUND OF THE INVENTION

This invention relates broadly to the field of consumer absorbent paper products and other washroom products, which includes, among other products, toilet tissue, paper towels and liquid products such as soap. More specifically, this invention involves an improved system and method for collecting data on individual and aggregate usage of washroom products in a manner that is not detectable to persons who are using the product.

A great deal of technical and market research is invested by manufacturers of high quality absorbent paper products, such as Kimberly-Clark Corporation, in designing and manufacturing products that are consistent as possible with consumer needs and preferences.

Unfortunately, for reasons both cultural and logistical, consumer habit information for certain products such as toilet tissue has been notoriously difficult to obtain. For example, data relating to factors as the total amount of paper used, the duration of time over which paper is used, the number of discrete pulls on the paper taken by a user and the amount of paper taken by a user per discrete pull would be very helpful for both marketing and engineering purposes. However, there has heretofore been no efficient way of compiling such data.

When collecting this type of information, it is important that consumers not know their activities are being monitored, since this may change their behavior. In addition, some consumers might become apprehensive at the thought of being monitored in this manner.

It is clear there has existed a long and unfilled need for a system and method for obtaining information on consumer tissue preferences and habits that is accurate, efficient and substantially undetectable by consumers.

SUMMARY OF THE INVENTION

Accordingly, it is an object of the invention to provide a system and method for obtaining information on consumer tissue preferences and habits that is accurate, efficient and substantially undetectable by consumers.

In order to achieve the above and other objects of the invention, a system for collecting data on toilet tissue use at a particular location, includes, according to a first aspect of the invention, a sensor for sensing one or more characteristics of toilet tissue use at a particular dispensing location; and a recorder, in communication with the sensor, for receiving and recording data from the sensor, whereby toilet tissue use at the dispensing location can be monitored and studied.

According to a second aspect of the invention, a system for analyzing individual and aggregate usage of toilet tissue use at a particular toilet stall, includes a determining system for determining whether a person is present in a toilet stall; a sensor for sensing one or more characteristics of toilet tissue use at the toilet stall; an analyzer for analyzing data that is supplied by the sensor; and a recorder for recording data from at least one of the sensor and the analyzer, the determining system, the sensor, the analyzer and the recorder being configured and positioned so as to be substantially undetectable to a user, whereby toilet tissue use at the toilet stall can be accurately monitored and studied.

According to a third aspect of the invention, a system for collecting data on the use of a roll form absorbent commercial paper product at a particular location includes a sensor for sensing one or more characteristics of paper use at a particular dispensing location; and a recorder, in communication with the sensor, for receiving and recording data from the sensor, whereby paper use at the dispensing location can be monitored and studied.

According to a fourth aspect of the invention, a method for collecting data relevant to an individual's use of an absorbent roll type paper product in a communal area includes steps of: (a) determining when a person enters an area that is adjacent to a paper product dispenser; (b) monitoring the person's use of the paper product in such a manner that the person is not aware of such monitoring; and (c) recording data obtained from the monitoring.

A still further aspect of the invention involves a system for monitoring product usage at a particular location. The system comprises a product dispenser in which a sensor device is positioned to detect removal of the product. A local transmission unit is in operative communication with the sensor. The local transmission unit generates a data signal of predetermined format representative of at least product usage, and wirelessly broadcasts the data signal. A data collection unit located remote from the dispenser is operative to receive the data signal and store usage information representative thereof.

Additional aspects of the invention are achieved by a system for monitoring product usage at a plurality of locations. The system comprises a plurality of product dispensers, each of which includes a sensor device positioned therein to detect removal of the product. A plurality of local transmission units are also provided, each associated with a respective dispenser to receive usage information from the respective sensor. The local transmission unit responsively generates a data signal of predetermined format. A data collection unit located remote from the dispenser is operative to receive data signals from all of the local transmitters and store usage information representative thereof.

A roll web product dispenser constructed according to the invention comprises a dispenser housing having a roll support mechanism located therein. A sensor element is operative to rotate as the roll web product is withdrawn by a user. The dispenser also includes a detector positioned to sense rotation of the sensor element. A local transmission unit in operative communication with the detector is positioned in the dispenser housing.

A liquid product dispenser constructed according to the invention comprises a dispenser housing having a liquid product reservoir located therein. An actuator mechanism is also provided for dispensing a quantity of product from the liquid product reservoir. A sensor is operative to detect that the quantity of product has been dispensed.

A folded web product dispenser constructed according to the invention comprises a dispenser housing adapted to maintain the folded web product in a stack. A sensor is positioned to detect removal of individual product sheets from the stack.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENTS

Figure 1:
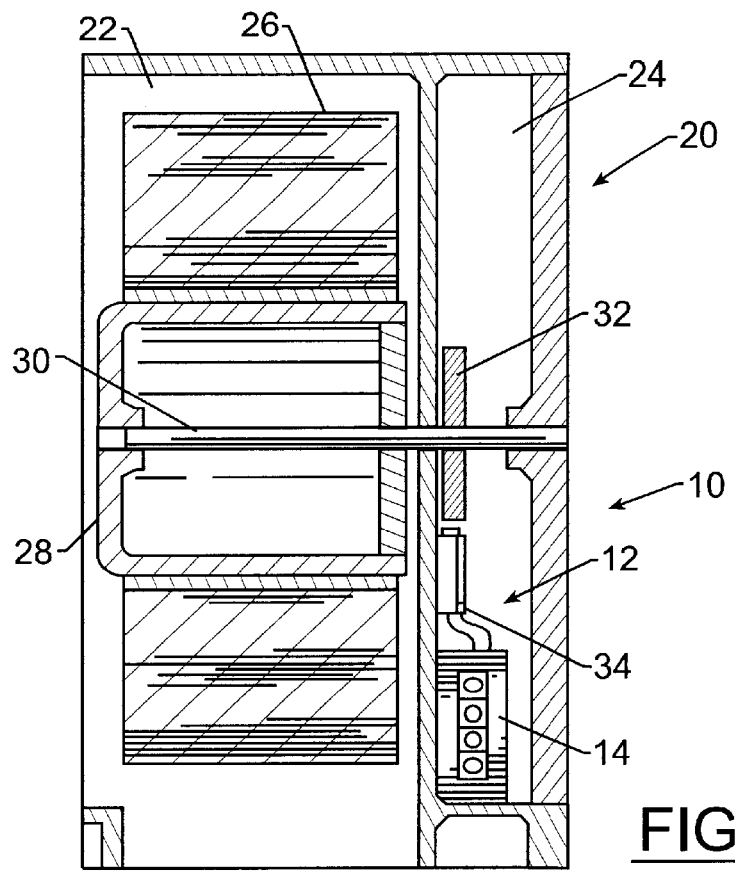
FIG. 1 is a cross sectional view of a system for collecting data on tissue consumption that is constructed according to a first, preferred embodiment of the invention.

Referring now to the drawings, wherein like reference numerals designate corresponding structure throughout the views, and referring in particular to FIG. 1, a system 10 for collecting data on toilet tissue use at a particular location includes a sensor 12 for sensing one or more characteristics of toilet tissue use at a particular dispensing location, and a control unit 14, which in the preferred embodiment analyzes and records data that is received from sensor 12. In the preferred embodiment, sensor 12 is constructed and arranged to sense quantitative characteristics of toilet tissue use, most preferably the amount of toilet tissue that is used by an individual or aggregate use at a location. As may be seen in FIG. 5, system 10 includes a CPU 18 for analyzing information from sensor 12, and a memory module 16 for storing the information and the products of the analysis.

Looking again to FIG. 1, it will be seen that system 10 includes a housing 20 having a first compartment 22 and a second compartment 24 defined therein. A roll 26 of toilet tissue is supported for rotation in the first compartment 22 of housing 20 on a spindle 28 that rotates together with an axis 30. Axis 30 extends into the second compartment 24 and is secured to a rotating member 32 that is constructed to rotate together with axis 30. Accordingly, rotating member 32 will rotate as a consumer pulls on the free end of the roll 26 of toilet tissue.

Figure 3:
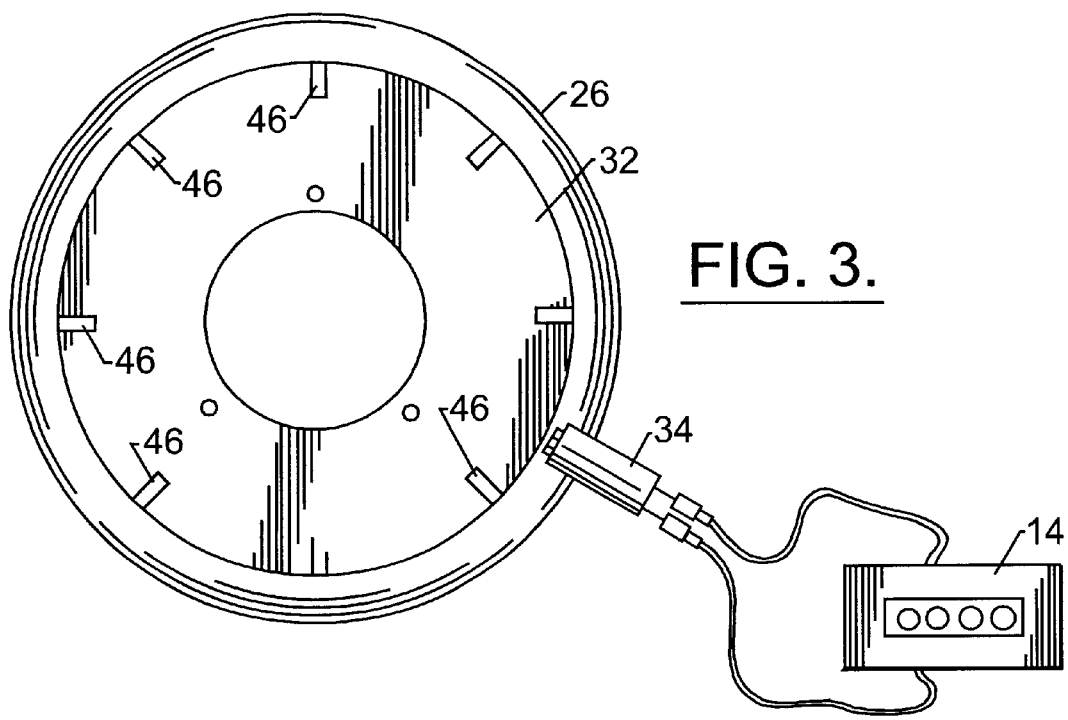
FIG. 3 is a diagrammatical view depicting one embodiment of a component in the system shown in FIGS. 1 and 2.

Sensor 12 includes, in the embodiment of FIG. 1, a magnetic movement detector 34 that senses rotational movement of member 32 in evenly spaced rotational increments, as may be seen in the diagrammatical view provided in FIG. 3. As shown in FIG. 3, rotating member 32 has a number of magnets 46 provided at even increments along the circumference thereof, which are detectable by magnet movement detector 34. These type of sensors are well known in the electromechanical arts.

Figure 2:
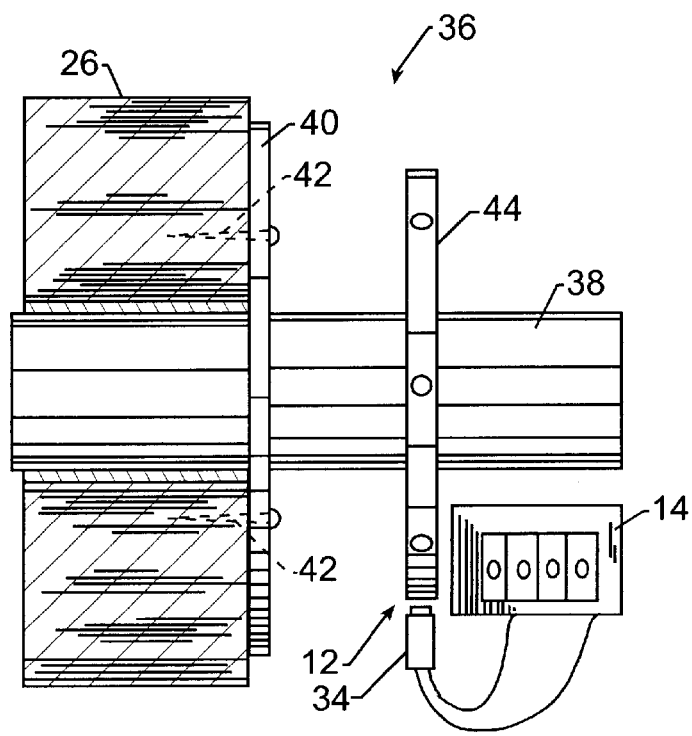
FIG. 2 is a cross sectional view depicting an alternative embodiment to that shown in FIG. 1.

FIG. 2 depicts a system 36 that is constructed according to a second embodiment of the invention. In system 36, a plate 40 is secured to the roll 26 of toilet tissue by a number of pins 42 that are inserted into the side of the roll 26. Plate 40 is secured to a spindle 38, which is in turn secured to a rotating member 44 that is substantially identical to the rotating member 32 described above. Rotational movement of member 44 is thus detected by a magnetic movement detector 34 in the manner described above with reference to FIGS. 1 and 3.

Figure 4:
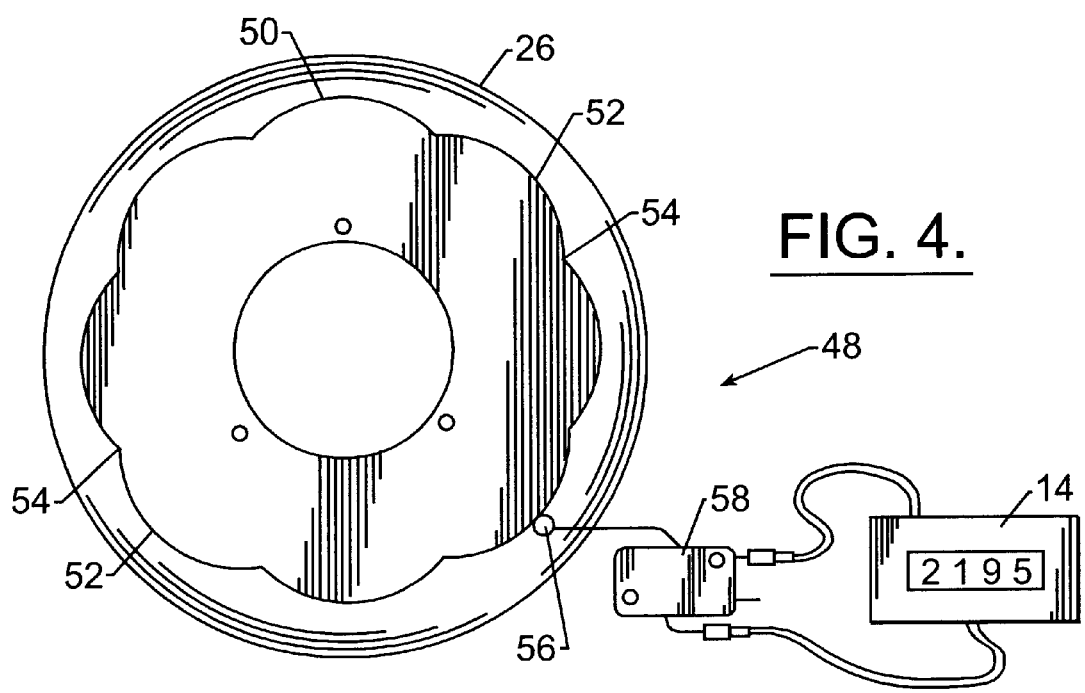
FIG. 4 is a diagrammatical view depicting an alternative version of the component depicted in FIG. 3.

FIG. 4 depicts a sensor 48 that is constructed according to an alternative embodiment of the invention. In this embodiment, a rotating member 50 is secured for rotation with the roll 26 of toilet tissue in either the manner described above with reference to FIG. 1, or that described with reference to FIG. 3. Rotating member 50 includes a number of cam riser portions 52 which alternate about the circumference of rotating member 50 with a corresponding member of cam troughs 54. A cam follower 56 is biased against rotating member 50 so as to actuate a mechanical switch 58 to a first portion when positioned on one of the cam risers, and to a second, opposite condition when positioned on one of the cam troughs 54. In this way, the angular position of rotating member 50 is indicated to control unit 14, much in the manner described above with reference to FIG. 3.

Figure 5:
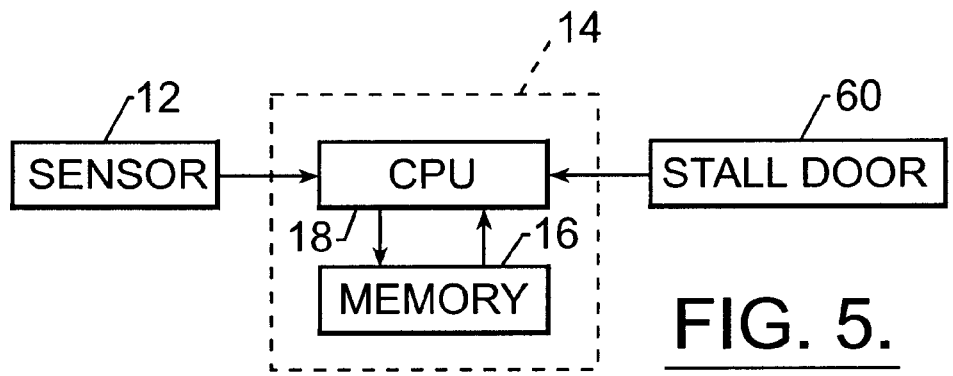
FIG. 5 is a schematic diagram of an overall system that may incorporate any of the embodiments of the invention shown in FIGS. 1–4.
Figure 6:
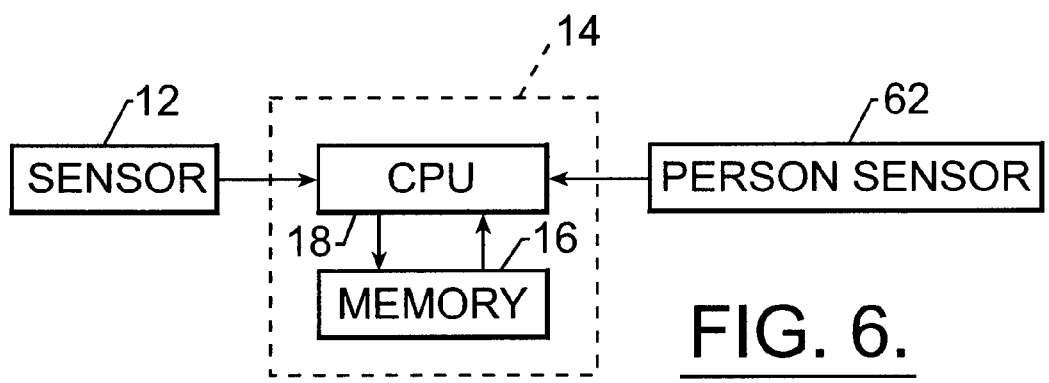
FIG. 6 is a second embodiment of the overall system depicted in FIG. 5.
Figure 7:
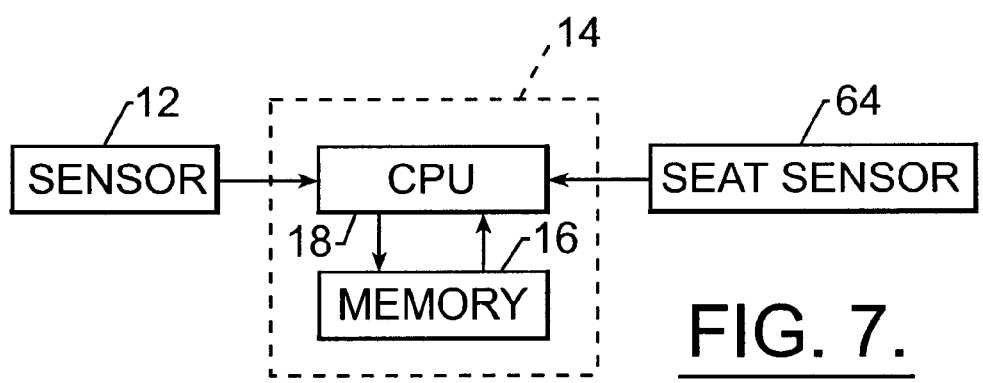
FIG. 7 is a schematic diagram depicting a third embodiment of the overall system shown in FIGS. 5 and 6.

FIGS. 5, 6 and 7 depict alternative embodiments of the overall system. To enable the control unit 14 to distinguish between information for individual users and aggregate information, it is necessary to monitor when each individual user enters and leaves the toilet stall or other similar defined space. In the embodiment depicted in FIG. 5, a sensor 60 is provided on the door of the toilet stall to indicate to the CPU unit 18 of control unit 14 when the stall door is opened and when it is closed. By processing this information, control unit 14 can accurately determine when each user enters the stall and leaves the stall.

In the embodiment of the invention that is depicted in FIG. 6, a sensor 62 is provided to determine when a person is present in the toilet stall. Person sensor 62 could be a beam of light or sound that is broken by the person when he or she enters and leaves the stall. Alternately, the sensor could detect the person's presence when he or she is sitting on the toilet.

In the embodiment of the invention shown in FIG. 7, a sensor 64 is provided beneath the seat of the toilet when an individual is sitting on the toilet. This will enable the control unit 14 to determine when an individual enters and leaves the area where he or she would be expected to use toilet tissue.

In operation, a user would enter the toilet stall area, and have his or her presence noted by the control unit 14 by one of the sensors 60, 62, or 64. As the individual uses toilet paper, the rotational displacement of the toilet roll is monitored and recorded by control unit 14. Control unit 14 may be programmed to calculate a number of different characteristics of toilet tissue use based on this information, including the total amount of tissue used by each individual, the duration of time over which the tissue is used, the number of discrete pulls on the toilet tissue taken by a user, and the amount of toilet tissue taken by a user per discrete pull. The products of such analysis may further be stored in the memory area 16 of control unit 14 for further analysis and/or retrieval. When the user leaves the stall area this is also recorded by one of the sensors 60, 62, or 64. Throughout the entire process, the consumer will be unaware that his or her activity is being monitored, resulting in an undiminished feeling of privacy, and accuracy of the data that is recorded.

Figure 8:
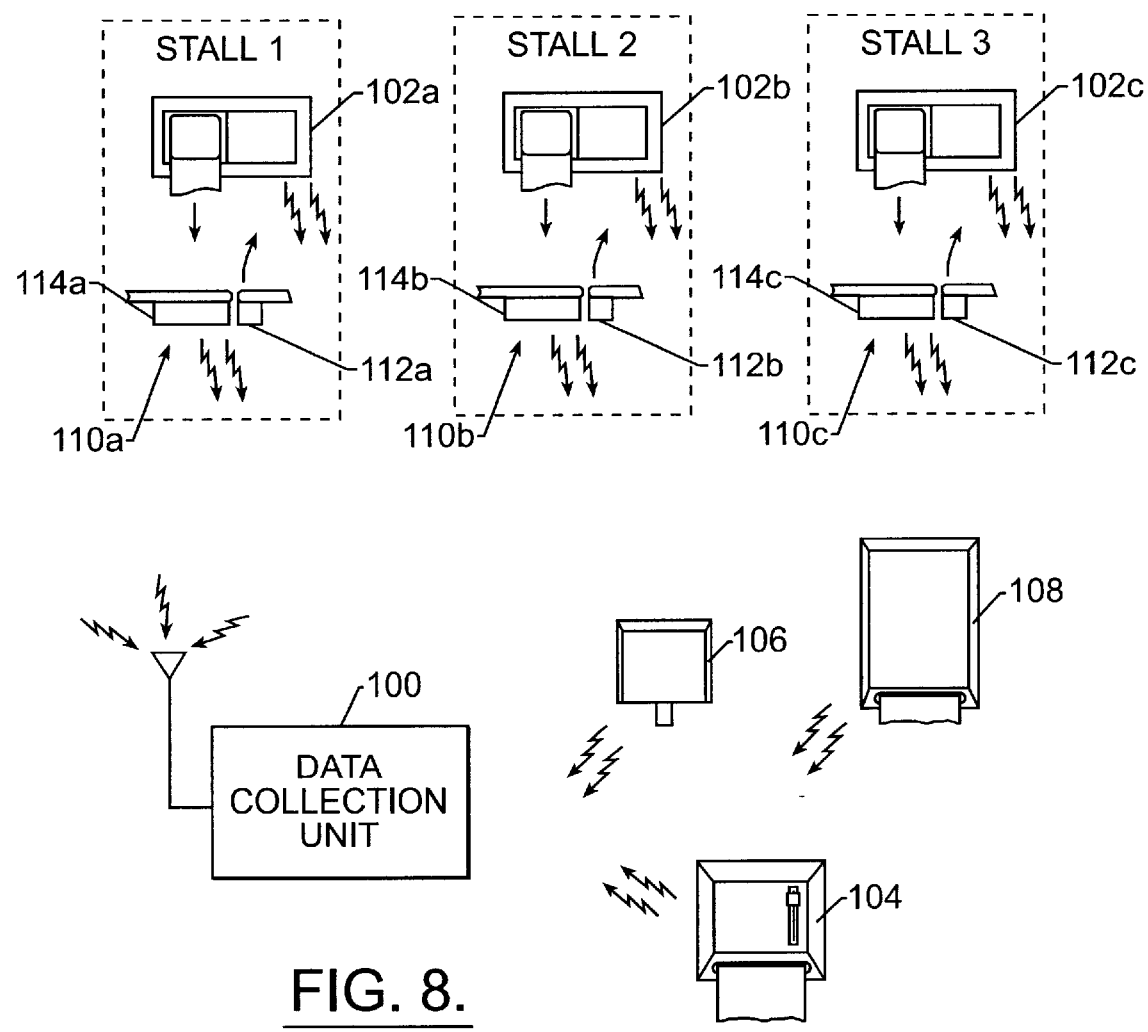
FIG. 8 is a diagrammatic representation of a usage data collection system in accordance with the present invention.

Further aspects of the present invention are illustrated in FIG. 8. A central data collection unit 100 is provided to receive usage information from a plurality of dispensers in a predetermined area. For example, product usage in a single public washroom may be monitored and stored for later analysis to determine usage patterns. Usage may also be monitored in real time to facilitate janitorial or maintenance functions.

In this case, data collection unit 100 receives usage information via wireless transmission from the respective dispensers. While various types of wireless transmission such as infrared are also contemplated, presently preferred embodiments of the invention utilize RF transmission. Each of the dispensers will have a local transmission unit associated therewith for broadcasting usage information to data collection unit 100.

A typical installation may include various combinations of product dispensers of different types. In the illustrated example, the system includes roll tissue dispensers 102*a–c*, roll towel dispenser 104, liquid product dispenser 106 and folded sheet dispenser 108. As is typical in public washroom facilities, the roll tissue dispensers are each located in a confined toilet stall. Thus, appropriate sensing arrangements, such as respective door sensors 110*a–c*, may be provided to determine when an individual enters or leaves a stall. In this case, door sensors 110*a–c* each comprise a respective movable magnet 112*a–c* mounted to the door, and a stationary switch/transmitter unit 114*a–c* mounted to the stationary stall structure. It is contemplated that other sensors such as beam-type sensors or seat sensors may be used.

Particularly when a dispenser is not located in a toilet stall, such as dispensers 104, 106, and 108, it may be desirable to detect the presence of an individual user using various other appropriate techniques. For example, optoelectronics such as used for activation of toilets and urinals can be employed to sense a person located in front of the dispenser. Alternatively, an elapsed time basis can be used to identify an "individual event". According to this technique, each time product is dispensed, an electronic "time stamp" can be noted. Dispensing events may be grouped into individual events on an elapsed time basis.

Figure 9:
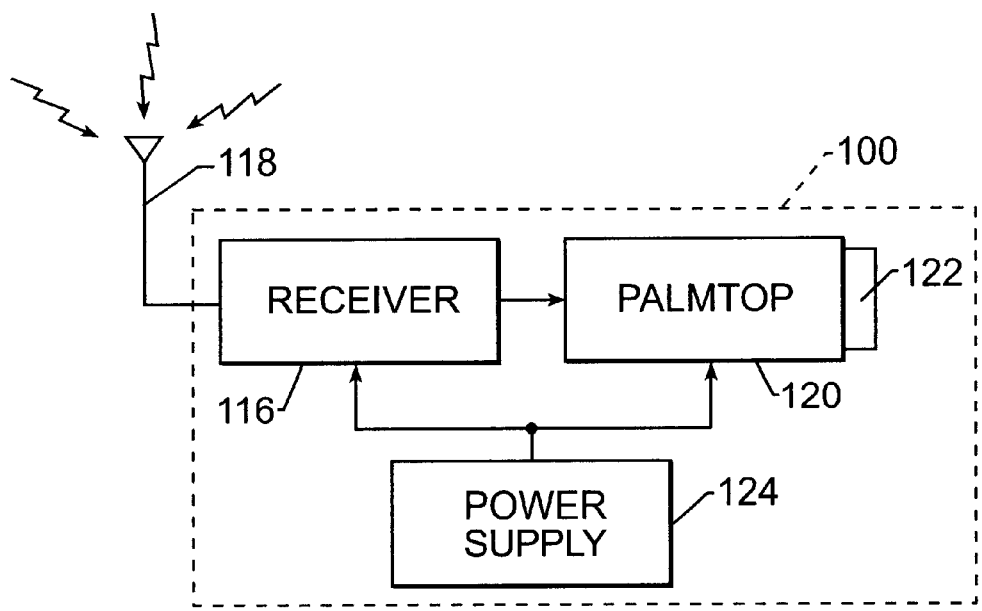
FIG. 9 is a block diagram showing functional components of a data collection unit such as may be employed in the system of FIG. 8.

Referring now to FIG. 9, data collection unit 100 includes a receiver 116 having an antenna 118 to receive data usage signals from the various dispensers. Receiver 116 communicates with a suitable processor 120, such as a relatively small "palmtop" computer. In this case, a removable data card 122, preferably of the PCMCIA type, is provided to store the usage information for later analysis. Receiver 116 and processor 120 are powered by a power supply 124, which may derive power from either a battery or the AC mains supply depending on the exigencies of a particular application. Particularly in a battery powered embodiment, it is desirable that processor 120 remain in a low power "sleep" mode except when needed for processing functions. Typically, receiver 116 will operate continually at full power to await receipt of transmissions.

Figure 10:
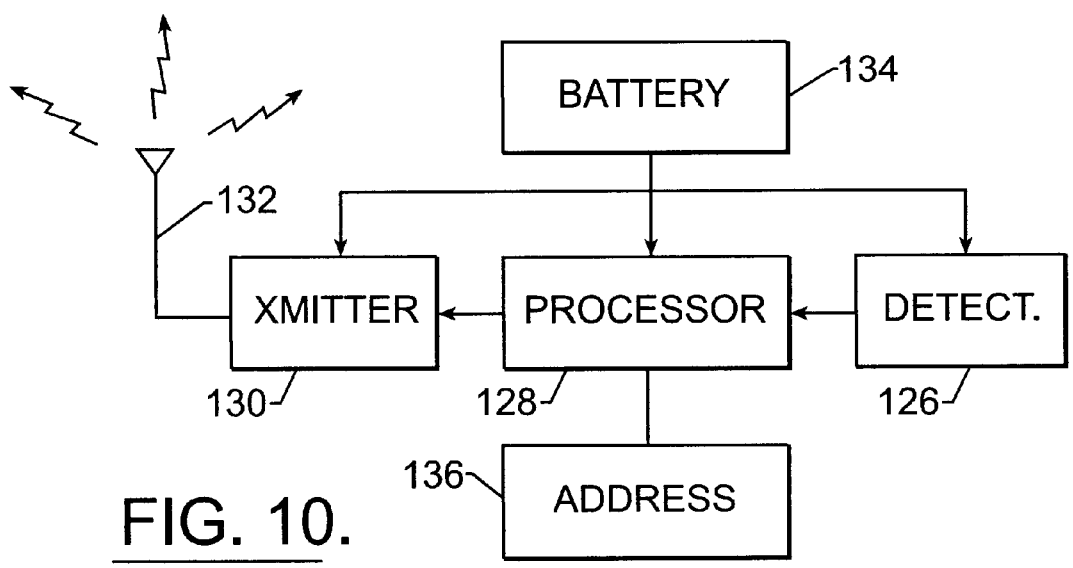
FIG. 10 is a block diagram showing functional components of a local arrangement such as may be employed with the various dispensers shown in FIG. 8.

A transmission unit that may be utilized with the various usage and presence sensing arrangements is illustrated in FIG. 10. The transmission unit includes a suitable detector 126 for sensing the event or quantity of interest. Detector 126 communicates with a processor 128, which in turn supplies a suitable data signal to transmitter 130. Transmitter 130 then broadcasts the data signal via antenna 132. The transmission unit further includes a battery supply 134 to provide power for operation of its various components. Preferably, the transmitter may send a "heartbeat" signal at predetermined times so that data collection unit 100 will know the transmitter is operating properly.

In battery powered embodiments, data collection unit 100 and the various transmitters may include circuitry to recharge the batteries from ambient light in the facility. Furthermore, dispenser embodiments having various rotatable parts may include regenerative means to recharge transmitter batteries. For example, rotatable sensor wheels such as described below with respect to FIG. 11 may be adapted with means to recharge batteries of the local transmitter unit.

The data signal will desirably include address data, retrieved by processor 128 from ROM memory 136, to make the identity the particular transmission unit sending the information known to data collection unit 100. The data signal may also be time/date stamped at either transmission or receipt so that usage patterns over a period of time can be accurately reviewed. Desirably, the data signal sent by each of the transmitters is also encoded to enhance data integrity.

In some desired embodiments, the RF signals are frequency modulated (FM) instead of amplitude modulated (AM) to enhance noise immunity. If several different locations are to be monitored simultaneously, it may be advantageous to alternate the carrier frequencies among nearby installations. For example, the systems installed in washrooms on adjacent floors of a public building can utilize disparate carriers frequencies to eliminate undesirable crosstalk. Two frequencies believed to be suitable in this application are 418 MHz and 433.92 MHZ. It is contemplated that other frequencies may also be used.

Figure 11:
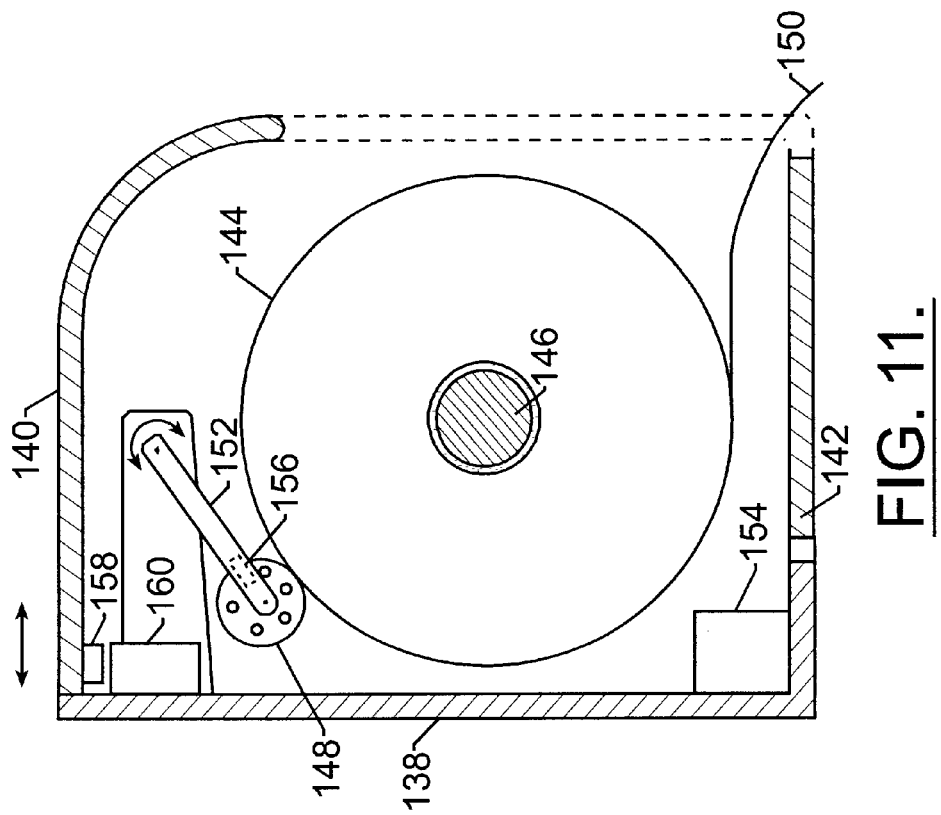
FIG. 11 is a partial cross sectional view showing the interior of a dispensing cabinet for rolled web product constructed in accordance with the present invention.

Referring now to FIG. 11, a further manner in which usage data may be obtained in a roll towel or tissue dispenser is illustrated. In this case, the dispenser has a stationary back portion 138 to which a door 140 is connected. Door 140 may be opened about pivot point 142 by a maintenance worker desiring to change the product roll. Otherwise, door 140 will remain closed by a suitable latching mechanism.

Roll web product 144 is maintained inside of the dispenser housing, and is supported for rotation on a rotatable spindle 146. As shown, a rotating sensor such as a wheel 148 in this case engages the outer surface of product 144 to turn as a user pulls product tail 150. Wheel 148 is itself mounted for rotation at the distal end of a pivot arm 152, as shown. It should be understood that the rotary sensor may be any suitable device and may include one or more cylinders, wheels, discs, spheres, or the like.

Because the diameter of wheel 148 is known, its rotation will directly translate into the length of product removed. Any suitable means may be utilized to determine the rotations taken by sensor wheel 148. In the illustrated embodiment, for example, a plurality of spaced apart magnets are situated about wheel 148. The magnets are detected as the wheel rotates by a magnetic switch 156.

The information derived by wheel 148 is then converted to a data signal as described above and broadcast to data collection unit 100 via transmission unit 154. The transmitted signal may thus include information regarding the number of pulls and the length of product removed with each pull. From this data, the total length of product used by the individual can be determined. The data signal may also include information about the rate at which the product is removed. The usage information may be transmitted immediately, or may be transmitted in batch form at predetermined times.

The embodiment illustrated in FIG. 11 further includes a door sensor arrangement to determine when door 140 is opened or closed. As described above with respect to the stall door sensors, such an arrangement may include a magnet 158 attached to door 140 for movement therewith. A stationary detector 160 attached to back portion 138 senses the presence or absence of magnet 158.

Often, roll towel dispensers may be equipped with multiple rolls, one of which is in position to dispense at any time. In some cases, janitorial personnel may replace both rolls even though one of the rolls, referred to as a stub roll, still contains some product. It will be appreciated that many embodiments of the data collecting system described herein can be configured to determine stub roll waste.

Figure 12:
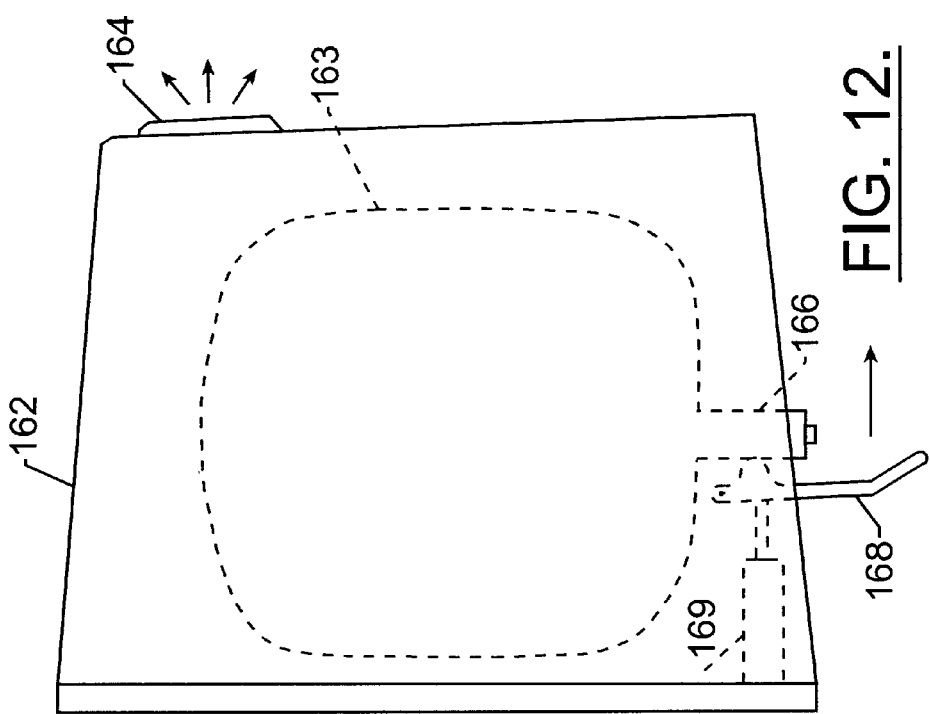
FIG. 12 is a side elevation of a liquid product dispenser constructed in accordance with the present invention with certain features shown in phantom.

FIG. 12 illustrates a liquid product dispenser constructed according to the present invention. The liquid may be liquid soap, body wash, creams, gels, and the like. As can be seen, the dispenser includes a housing 162 containing a soap reservoir 163 therein. The dispenser includes a presence detector 164 on its housing, which may be of the optoelectronic type as described above.

A dispensing tube 166 depends from reservoir 163 to deliver liquid product to the user when desired. Soap is dispensed by actuation of a pump lever 168.

Various methods are contemplated for determining the amount of liquid product dispensed with each actuation. For example, it may be possible to determine product usage by weighing the reservoir before and after a quantity is dispensed. In the illustrated embodiment, however, an estimate of the product removed from reservoir 163 is derived by measuring the stroke of lever 168. Toward this end, actuation sensor 169 includes a movable portion connected to lever 168 and a stationary portion connected to the housing 162. A full stroke is known to dispense a certain nominal quantity, whereas a partial stroke will typically dispense less. Where a more precise estimate is necessary, it may be desirable to utilize a more sophisticated neural network approach which "knows" the output quantity of the dispenser based on various input parameters.

Although the dispenser shown in FIG. 12 is manually actuated, various automatic liquid product dispensers may also be equipped with usage sensors according to the present invention. In fact, some automatic sensors are designed to dispense a very precise "shot" of product each time. With these dispensers, the mere fact that a shot has been dispensed will directly translate into the quantity of interest.

The remaining figures illustrate various alternatives for determining product usage from a folded towel or tissue dispenser. With dispensers of this type, a user will generally remove one sheet of product with each pull. Sheets may be interfolded or may have other fold configurations.

Since the length of each sheet is known, the total usage can be calculated based on the number of pulls.

Figure 13C:
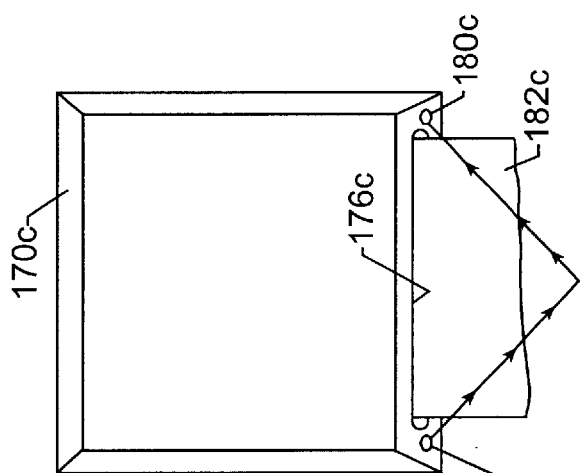
FIGS. 13A through 13C show folded web product dispensers constructed in accordance with the present invention having alternative optical sensing arrangements.
Figure 13B:
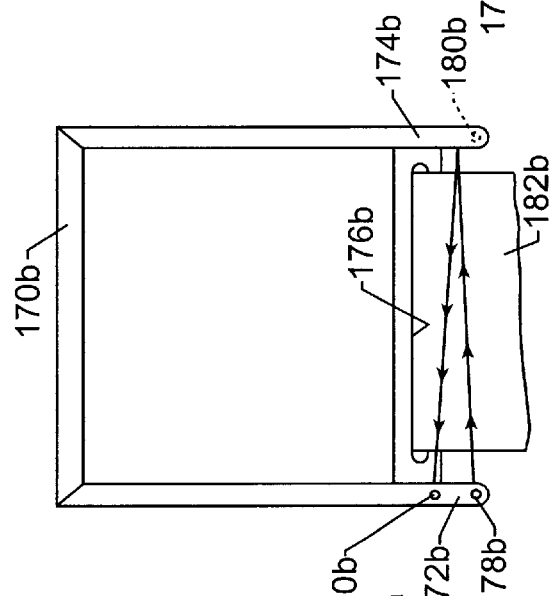
Figure 13A:
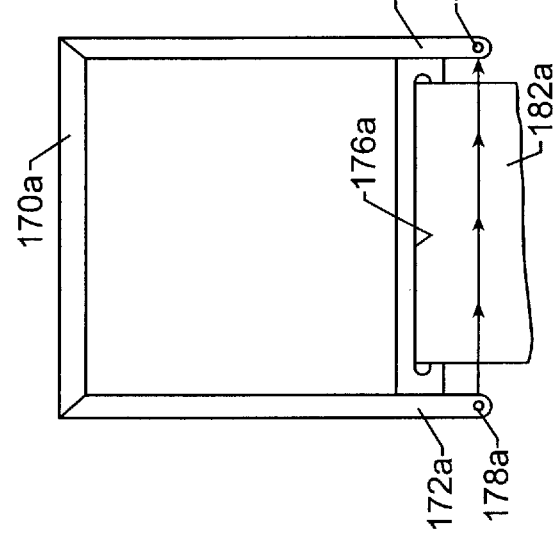

Referring particularly to FIG. 13A, dispenser 170a includes a pair of depending portions 172a and 174a located at opposite ends of the dispenser throat 176a. A light source 178a located on depending portion 172a directs a light beam to a light detector 180a located on depending portion 174a. When a user reaches to retrieve sheet 182a, the light beam is broken. The event may be construed as one pull for determining usage as described above.

FIG. 13B represents a variation of the technique shown in FIG. 13A. In this case, light source 178b and light detector 180b are each located on depending portion 172b. A reflector 184 is located on depending portion 174b to reflect the light beam between light source 178b and light detector 180b.

In the embodiment of FIG. 13C, dispenser 170c does not utilize depending portions on opposite sides of the dispensing throat. Instead, light source 178c and light detector 180c are mounted directly to the bottom of the dispenser housing in converging directions as shown. The user's hand itself functions as a reflector to complete the beam when sheet 182c is withdrawn.

Figure 14:
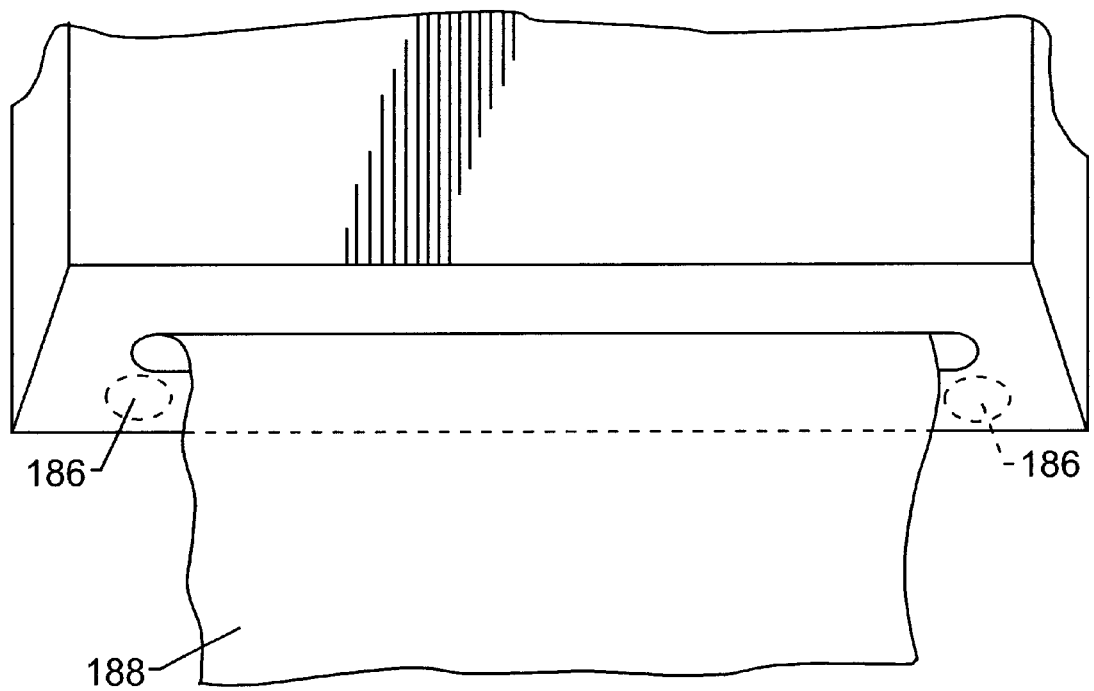
FIG. 14 is a fragmentary view showing a folded web product dispenser constructed in accordance with the present invention having a further alternative sensing arrangement.

FIG. 14 illustrates a further alternative for determining when a folded web sheet has been withdrawn. Here, one or more load sensors 186 are mounted internally to the dispenser below the stack of sheets. When the user withdraws sheet 188, a downward impulse is measured by the load sensors.

This impulse corresponds a single pull, which may be used to determine product usage as described above.

Figure 15:
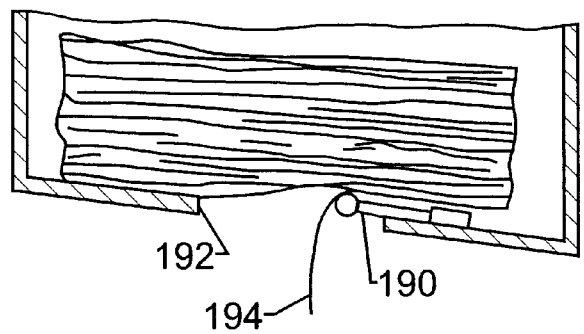
FIG. 15 is a fragmentary sectional view showing a folded web product dispenser constructed in accordance with the present invention having a still further alternative sensing arrangement.

A further alternative is illustrated in FIG. 15. Here, an elongate sensor element 190 extends into the dispenser throat 192. Sheet 194 engages element 190 as it is withdrawn, thus indicating that a single pull has occurred. In exemplary embodiments, element 190 may comprise a flexible variable resistor.

While various sensor arrangements have been shown and described, the invention contemplates the use of any usage sensor that achieves the desired results. For example, various sonic sensors or body heat sensors may be used on one or more of the above-described dispensers. Neural network means may also be used in any dispenser, where appropriate, to more accurately gauge usage. For example, a neural network can be used with a sonic sensor in a folded web dispenser to distinguish between sound patterns created when one sheet, or more than one sheet, is removed. It will also be appreciated that lever-actuated roll towel dispensers can include sensors that detect the lever stroke. In this manner, the amount of product dispensed can be easily determined.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed. For example, various systems described above can often be hardwired instead of wireless, depending on the exigencies of a particular application. In addition, features of one embodiment can be interchanged with features of other embodiments to yield still further embodiments.

What is claimed is:

1. A system for monitoring product usage at a particular location, said system comprising:
   a product dispenser, the dispenser comprising a rotating member;
   a sensor device positioned in said dispenser to detect removal of said product, wherein the sensor device is adapted to measure rotational increments of the circumference of the rotating member of the dispenser;
   a local transmission unit in operative communication with said sensor, said local transmission unit generating a data signal of predetermined format representative of at least product usage and wirelessly broadcasting said data signal; and
   a data collection unit located remote from said dispenser, said data collection unit operative to receive said data signal and store usage information representative thereof.

2. A system as set forth in claim 1, wherein said dispenser is configured to dispense absorbent roll web product.

3. A system as set forth in claim 1, wherein said data collection unit stores said usage information on a removable data card.

4. A system as set forth in claim 1, wherein said data collection unit includes a receiver in operative communication with a processor device, said receiver being powered up continually to await receipt of transmissions.

5. A system as set forth in claim 4, wherein said processor device is normally maintained in a low power mode.

6. A system as set forth in claim 1, further comprising:
   means for determining when an individual user is in an area to remove product from said dispenser; and
   a second local transmission unit in operative communication with said means for determining, said second local transmission unit generating a second data signal of predetermined format and wirelessly broadcasting said second data signal.

7. A system as set forth in claim 6, wherein said dispenser is located in a toilet stall and said means for determining comprises a door sensor positioned to indicate stall door activity.

8. A system as set forth in claim 1, wherein said data signal includes an address to identify said dispenser to said data collection unit.

9. A system as set forth in claim 1, wherein said local transmission unit is operative to wirelessly broadcast said data signal as a RF signal.

10. A system as set forth in claim 9, wherein said RF signal is a frequency-modulated signal.

11. A system as set forth in claim 10, wherein said RF signal is broadcast at a carrier frequency of 418 MHZ.

12. A system as set forth in claim 10, wherein said RF signal is broadcast at a carrier frequency of 433.92 MHZ.

13. A system as set forth in claim 1, wherein said local transmission unit is operative to wirelessly broadcast said data signal as an infrared signal.

14. A system for monitoring product usage at a plurality of locations, said system comprising:
   a plurality of product dispensers, at least one dispenser having a rotating member;
   each of said product dispensers including a sensor device positioned therein to detect removal of said product wherein the sensor device is adapted to measure rotational increments of the circumference of the rotating member of the dispenser;
   a plurality of local transmission units, each of said local transmission units being associated with a respective dispenser to receive usage information from said sensor, said local transmission unit generating a data signal of predetermined format; and
   a data collection unit located remote from said dispenser, said data collection unit operative to receive data signals from all of said local transmission units and store usage information representative thereof.

15. A system as set forth in claim 14, wherein said local transmission unit is operative to wirelessly broadcast said data signal to said data collection unit.

16. A system as set forth in claim 15, wherein said local transmission unit is operative to wirelessly broadcast said data signal as a RF signal.

17. A system as set forth in claim 15, wherein said local transmission unit is operative to wirelessly broadcast said data signal as an infrared signal.

18. A system as set forth in claim 14, wherein said plurality of product dispensers include dispensers configured to dispense absorbent roll web product.

19. A system as set forth in claim 14, wherein said data collection unit stores said usage information on a removable data card.

20. A system as set forth in claim 14, wherein said data collection unit includes a receiver in operative communication with a processor device, said receiver being powered up continually to await receipt of transmissions.

21. A system as set forth in claim 20, wherein said processor device is normally maintained in a low power mode.

22. A system as set forth in claim 14, wherein said data signal includes an address to identify said dispenser to said data collection unit.

23. A system as set forth in claim 14, further comprising means to determine the presence of an individual user in an area proximate one or more of said dispensers.

24. A system for monitoring product usage at a particular location, said system comprising:
   a product dispenser configured to dispense absorbent roll web product, the dispenser comprising a rotating member;
   a sensor device positioned in said dispenser to detect removal of said product wherein the sensor device is adapted to measure rotational increments of the circumference of the rotating member of the dispenser, wherein said sensor comprises a roller mounted to rotate against an outer surface of said absorbent roll web product to generate a circumferential distance wherein said circumferential distance comprises an output indicative of a length of product withdrawn by a user;
   a local transmission unit in operative communication with said sensor, said local transmission unit generating a data signal of predetermined format which is representative of at least product usage and wirelessly broadcasting said data signal; and
   a data collection unit located remote from said dispenser, said data collection unit operative to receive said data signal and store usage information representative thereof.

* * * * *